United States Patent
Mn et al.

(10) Patent No.: US 8,909,395 B2
(45) Date of Patent: Dec. 9, 2014

(54) SYSTEM AND METHOD FOR AIRCRAFT PERFORMANCE PREDICTIONS FOR CLIMB FLIGHT PHASE

(75) Inventors: Veeresh Kumar Mn, Bangalore (IN); Dinesh Kumar Kushwaha, Bangalore (IN); Chaitanya Pavan Kumar, Bangalore (IN)

(73) Assignee: Airbus Engineering Centre India, Bangalore (IN)

( * ) Notice: Subject to any disclaimer, the term of this patent is extended or adjusted under 35 U.S.C. 154(b) by 238 days.

(21) Appl. No.: 13/459,092

(22) Filed: Apr. 28, 2012

(65) Prior Publication Data

US 2012/0277935 A1 Nov. 1, 2012

(30) Foreign Application Priority Data

Apr. 29, 2011 (IN) .......................... 1485/CHE/2011

(51) Int. Cl.
- *G06F 19/00* (2011.01)
- *G01C 23/00* (2006.01)
- *G05D 1/06* (2006.01)
- *G05D 1/00* (2006.01)

(52) U.S. Cl.
CPC .............. *G01C 23/00* (2013.01); *G05D 1/0083* (2013.01); *G05D 1/0661* (2013.01)
USPC ............................................. 701/15; 701/14

(58) Field of Classification Search
CPC ........................... G05D 1/0661; G05D 1/0083
USPC ...................................................... 701/14, 15
See application file for complete search history.

(56) References Cited

U.S. PATENT DOCUMENTS

| | | | | |
|---|---|---|---|---|
| 4,750,127 A * | 6/1988 | Leslie et al. | | 701/16 |
| 5,070,458 A * | 12/1991 | Gilmore et al. | | 701/14 |
| 7,431,243 B1 | 10/2008 | Allen | | |
| 8,050,840 B2 * | 11/2011 | Rado | | 701/80 |
| 2009/0112535 A1 * | 4/2009 | Phillips | | 703/2 |
| 2012/0316706 A1 * | 12/2012 | Guedes et al. | | 701/15 |

FOREIGN PATENT DOCUMENTS

| | | | | |
|---|---|---|---|---|
| WO | 9508144 | | 3/1995 | |
| WO | WO95/08144 | * | 3/1995 | G05D 1/08 |
| WO | 2008112530 | | 9/2008 | |

* cited by examiner

*Primary Examiner* — Calvin Cheung
(74) *Attorney, Agent, or Firm* — Prakash Nama; Global IP Services, PLLC

(57) ABSTRACT

A system and method for aircraft performance predictions for climb flight phase is disclosed. In one embodiment, a method of aircraft performance predictions for climb flight phase in a flight management system (FMS) includes determining current predicted aircraft state using a total energy of the aircraft. Further, excess energy available in an engine of the aircraft is computed. Furthermore, a change of speed of the aircraft is computed at a given point in the climb flight phase. Kinetic energy (KE) change required is then computed for the computed speed change. Remaining energy available is then computed based on the computed KE change. The aircraft performance predictions for the climb flight phase are then computed using the determined current predicted aircraft state.

24 Claims, 5 Drawing Sheets

SYSTEM AND METHOD FOR AIRCRAFT PERFORMANCE PREDICTIONS FOR CLIMB FLIGHT PHASE

FIELD OF TECHNOLOGY

Embodiments of the present subject matter relate to flight management systems. More particularly, embodiments of the present subject matter relate to aircraft performance predictions for climb flight phase.

BACKGROUND

Modern aircrafts generally include an onboard computing system called flight management system (EMS). The FMS provides the flight crew with information on future states of the aircraft along a selected flight path. This information is based on performance predictions of the aircraft during various phases of the flight. Typically, the flight plan includes a climb flight phase which starts from an acceleration altitude and is considered to be completed once the aircraft reaches a cruise altitude (also referred to as "top-of-climb"). Predictions of time, fuel consumption, altitude, aircraft speed and other parameters at en route points until the top-of-climb provide useful information about the future performance of the aircraft. Typically, such predictions are displayed to the flight crew.

Currently, the criteria used for obtaining the information are preset or the parameter values may be assumed. For example, climb angle, fuel flow and true air speed (TAS) may be considered to vary linearly with the altitude. Further, constant values may be considered for parameters, such as air speed, lapse rate, temperature and the like to obtain the information. This can result in providing inaccurate information to the flight crew during the climb flight phase.

SUMMARY

A system and method for aircraft performance predictions for climb flight phase is disclosed. According to one aspect of the present subject matter, a method of aircraft performance predictions for the climb flight phase in a flight management system (FMS) includes determining current predicted aircraft state using a total energy of the aircraft. Further, excess energy available in an engine of the aircraft is computed. Furthermore, a change of speed of the aircraft is computed at a given point in the climb flight phase. In addition, kinetic energy (KE) change required is computed for the computed speed change. Also, remaining energy available is computed based on the computed KE change. Also, the aircraft performance predictions for the climb flight phase are computed using the determined current predicted aircraft state.

According to another aspect of the present subject matter, a non-transitory computer-readable storage medium for the aircraft performance predictions for the climb flight phase, having instructions that, when executed by a computing device causes the computing device to perform the method described above.

According to yet another aspect of the present subject matter, the aircraft includes the FMS. Further, the FMS includes a processor and memory coupled to the processor. Furthermore, the memory includes an aircraft performance predictions module. In one embodiment, the aircraft performance predictions module includes instructions to determine current predicted aircraft state using the total energy of the aircraft. Further, the aircraft performance predictions module computes the aircraft performance predictions for the climb flight phase using the determined current predicted aircraft state.

The methods and systems disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for aircraft performance predictions for climb flight phase is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
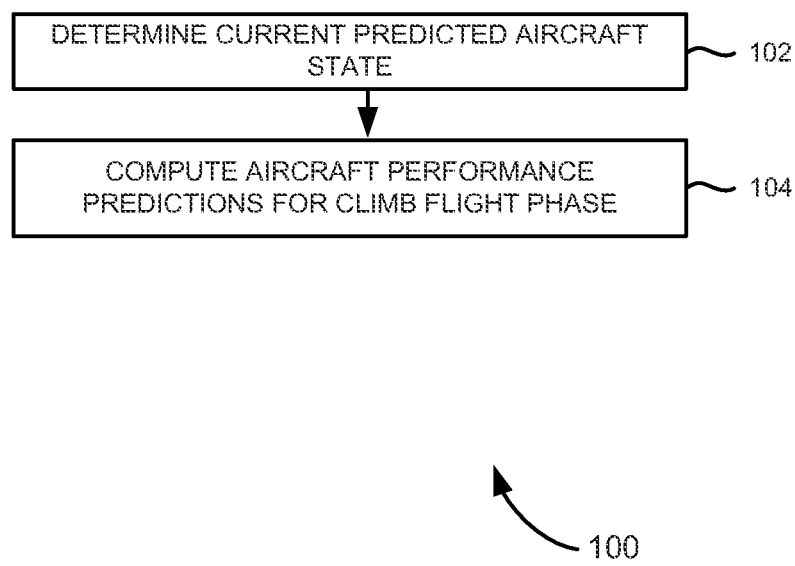
FIG. 1 illustrates a flow diagram of an exemplary method of aircraft performance predictions for climb flight phase in a flight management system (FMS)

FIG. 1 illustrates a flow diagram 100 of an exemplary method of aircraft performance predictions for climb flight phase in a flight management system (FMS). At block 102, current predicted aircraft state is determined using a total energy of the aircraft. Exemplary current predicted aircraft state includes flight parameters, such as aircraft gross weight, flying altitude, distance covered by the aircraft, aircraft speed and the like. The steps involved in determining the current predicted aircraft state are explained in more detail with reference to FIG. 2. At block 104, the aircraft performance predictions are computed for the climb flight phase using the determined current predicted aircraft state.

Figure 2:
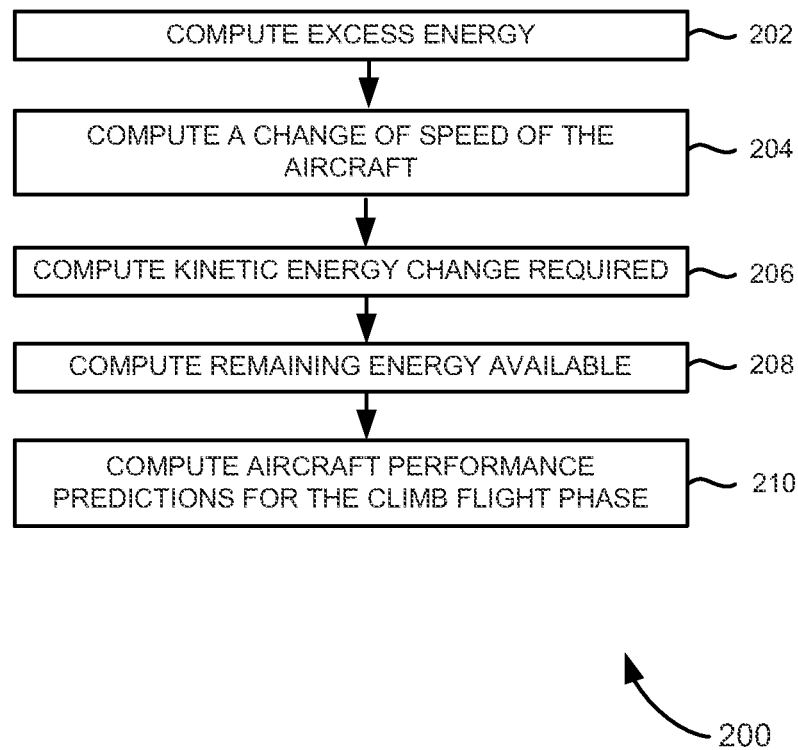
FIG. 2 illustrates another flow diagram of an exemplary method of computing the aircraft performance predictions based on energy state of the aircraft for the climb flight phase in the FMS.

Referring now to FIG. 2, which illustrates another flow diagram 200 of an exemplary method of computing the aircraft performance predictions based on energy state of the aircraft for the climb flight phase in the FMS. Particularly, FIG. 2 elaborates the process step 102 in FIG. 1. At block 202, excess energy available in an engine of the aircraft is computed. Further, the excess energy available in the engine of the aircraft is computed using an equation:

$$f_{excess}v/m = g(dh/dt) + v(dv/dt) \quad (1)$$

wherein,
$f_{excess}$ is the excess force available in the aircraft;
x is a distance covered by the aircraft;
m is a mass of the aircraft;
g is acceleration due to gravity;
h is altitude of the aircraft above ground level; and
v is a true air speed (TAS).

At block 204, a change of speed of the aircraft is computed at a given point in the climb flight phase. Furthermore, the change of speed of the aircraft at the given point in the climb flight phase is computed using an equation:

$$dv = TAS_n - TAS_{n-1} \quad (2)$$

wherein,
n is a time step (e.g., n=0, 1, 2 . . . ).

At block 206, kinetic energy (KE) change required for the computed speed change is computed. In addition, the KE change required for the computed speed change is computed using an equation:

$$KE\ required = vdv/dt \quad (3)$$

wherein,
v is the TAS.

At block 208, remaining energy available is computed based on the computed KE change. Also, the remaining energy available based on the computed KE change is computed using an equation:

$$remaining\ energy = f_{excess}v/m - v(dv/dt) \quad (4)$$

wherein,
$f_{excess}$ is the excess force available in the aircraft;
v is the TAS; and
m is the mass of the aircraft.

Moreover, the computed remaining energy available is used for changing the potential energy (PE) of the aircraft in the climb flight phase.

At block 210, the aircraft performance predictions are computed for the climb flight phase using the computed remaining energy. Further, the aircraft performance predictions for the climb flight phase are determined for each way point using the computed remaining energy. The computations are explained in more detail with reference to FIG. 4.

Figure 3:
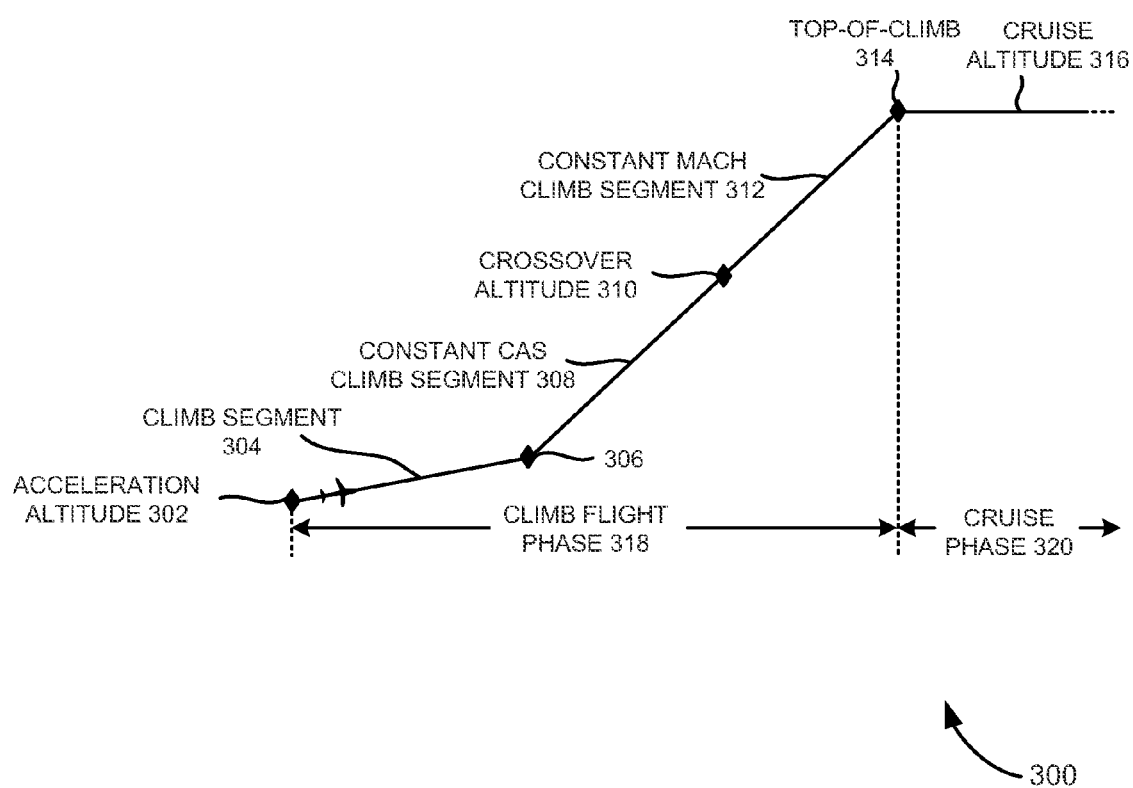
FIG. 3 illustrates climb flight phase profile, in the context of the invention.

Referring now to FIG. 3, which illustrates climb flight phase profile, in the context of the invention. Generally, the climb flight phase profile includes the climb flight phase 318 followed by a cruise phase 320, as shown in FIG. 3. Normally, the climb flight phase 318 starts from an acceleration altitude 302 and is considered to be completed at a top-of-climb 314, as shown in FIG. 3. The climb flight phase 318 further includes a climb segment 304, a constant calibrated air speed (CAS) climb segment 308, a crossover altitude 310 and a constant MACH climb segment 312, as shown in FIG. 3. The cruise phase 320 typically starts from the top-of-climb 314, as shown in FIG. 3. Further as shown in FIG. 3, the cruise phase 320 includes a cruise altitude 316.

Furthermore as shown in FIG. 3, the acceleration altitude 302 is the altitude at which the aircraft starts accelerating to reach a pre-computed CAS. At the acceleration altitude 302, the aircraft enters the climb segment 304. In the climb segment 304, the aircraft accelerates till the pre-computed CAS is reached. After the pre-computed CAS is reached, at point 306, the aircraft enters the constant CAS climb segment 308. In the constant CAS climb segment 308, the aircraft speed is held constant till the crossover altitude 310 is reached. At the crossover altitude 310, the aircraft is switched from the constant CAS to a pre-computed MACH. Further, at the crossover altitude 310, the aircraft enters the constant MACH climb segment 312. In the constant MACH climb segment 312, the MACH of the aircraft is held constant till the aircraft reaches the top-of-climb 314. The top-of-climb 314 is the point at which the aircraft reaches the cruise altitude 316. The cruise altitude 316 is the altitude at which the aircraft is maintained while cruising.

In an exemplary scenario, based on the crossover altitude 310, the aircraft may directly accelerate into the constant MACH climb segment 312 and then the MACH of the aircraft is held constant. In this scenario, the constant CAS climb segment 308 is not flown. In another exemplary scenario, if the crossover altitude 310 is greater than the cruise altitude 316, then the constant MACH climb segment 312 is not flown. Further in this scenario, the CAS of the aircraft is held constant till the top-of-climb 314.

Figure 4:
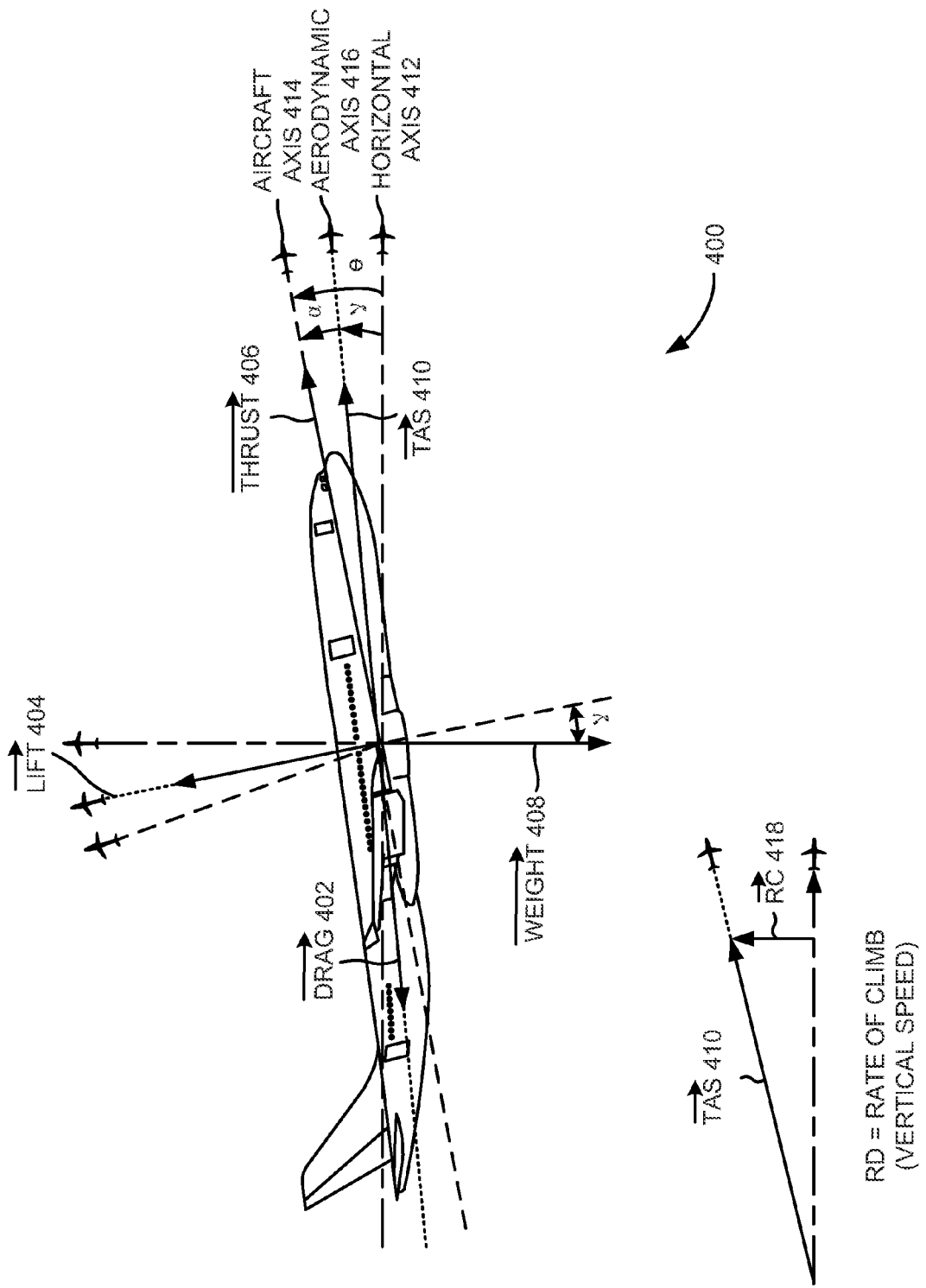
FIG. 4 illustrates exemplary balance of forces experienced by the aircraft during climb flight phase.

Referring now to FIG. 4, which illustrates an exemplary balance of forces experienced by an aircraft 400 during the climb flight phase. Particularly. FIG. 4 illustrates determining the current predicted aircraft state using the total energy of the aircraft. Further, based on the forces acting on the aircraft 400 and the current predicted aircraft state, the aircraft performance predictions are computed.

Generally, the total energy gained by the aircraft 400 when the excess force is acting on the aircraft 400 is expressed using equation:

$$\Delta E_{TOTAL} = \Delta E_{PE} + \Delta E_{KE} \quad (5)$$

wherein,
$\Delta E_{TOTAL}$ is a total energy gained by the aircraft 400;
$\Delta E_{PE}$ is a PE gained by the aircraft 400; and
$\Delta E_{KE}$ is a KE gained by the aircraft 400.

The excess force available in the aircraft 400 is expressed using equation:

$$f_{excess}x = mgh + \tfrac{1}{2}mv^2 \quad (6)$$

wherein,
$f_{excess}$ is the excess force available in the aircraft 400;
x is the distance covered by the aircraft 400;
m is the mass of the aircraft 400;
g is the acceleration due to gravity;
h is the altitude of the aircraft 400; and
v is the TAS 410, shown in FIG. 4, of the aircraft 400.

Further, differentiating the equation (6) results in the following equation:

$$f_{excess}dx/dt = mg(dh/dt) + \tfrac{1}{2}m(dv^2/dt) \quad (7)$$

Applying, $dv^2 = 2vdv$ and dividing both-sides of the equation (7) by the term 'm', we obtain the equation (1):

$$f_{excess}v/m = g(dh/dt) + v(dv/dt)$$

wherein,
dh/dt is a rate of climb of the aircraft 400; and
dv/dt is the acceleration of the aircraft 400.

In this embodiment, the energy state of the aircraft for the climb flight phase in computed for each time step as shown below. Typically, force is a combination of a thrust 406, shown in FIG. 4, provided by the engine of the aircraft 400 and a drag 402, shown in FIG. 4, experienced by the aircraft 400. Therefore, excess specific energy in the aircraft 400 can be expressed using the following equation:

$$excess\ specific\ energy = (thrust - drag)*TAS/m \quad (8)$$

In the equation (8), $$(\text{thrust} - \text{drag}) = f_{excess} \quad (9)$$

Further as shown in FIG. 4, the thrust 406 is the force assumed to be acting on the aircraft 400 along an aircraft axis 414. Furthermore, the thrust 406 is obtained from the performance database based on the current predicted aircraft state which includes parameters, such as aircraft gross weight, flying altitude and the aircraft speed. In addition as shown in FIG. 4, the drag 402 is the force acting on the aircraft 400 along an aerodynamic axis 416. Also, the drag 402 is obtained using equation:

$$\text{drag} = \tfrac{1}{2}\rho S(\text{TAS})^2 C_D \quad (10)$$

wherein, $\rho$ is a density of air;

S is a surface area of the wing of the aircraft 400; and $C_D$ is a drag coefficient.

In this embodiment, the computations in the climb segment 304 include computing dv/dt and dh/dt. The climb segment 304 is flown by considering that a percentage, say K, of the total energy available is used for gaining PE and the remaining energy (100–K) is used for gaining KE. Further, the value of K is obtained from a performance database. Furthermore, dh/dt for the climb segment 304 is obtained using equation:

$$dh/dt = (K/g) \cdot f_{excess} v/m \quad (11)$$

In addition, dv/dt for the climb segment 304 is obtained using equation:

$$dv/dt = ((100-K)/v) * f_{excess} v/m \quad (12)$$

Also in this embodiment, the computation in the constant CAS climb segment 308 and the constant MACH climb segment 312 includes computing dh/dt. dv/dt for the constant CAS climb segment 308 and the constant MACH climb segment 312 is normally a very small value as the CAS and the MACH of the aircraft 400, respectively, are held constant. The computations in the constant CAS climb segment 308 and the constant MACH climb segment 312 are described in the following steps.

In an exemplary first step, the speed change (dv/dt) is computed by using the equation (2):

$$dv = \text{TAS}n - \text{TAS}n-1$$

wherein, n is a time step (e.g., n=0, 1, 2 . . . ).

The equation (2) is obtained by subtracting the previous time step TAS 410 from the current time step TAS 410.

Further in an exemplary second step, the KE change (vdv/dt) required is computed. In the constant CAS climb segment 308 and the constant. MACH climb segment 312 the CAS and the MACH of the aircraft 400, respectively, are held constant. However, for a given CAS or MACH the TAS 410, shown in FIG. 4, is a function of the altitude of the aircraft 400. The relation between the TAS 410 and the CAS can be expressed using the equation:

$$\text{TAS} = \sqrt{(\rho_0/\rho)} * K_a * \text{CAS}$$

wherein, $\rho_0$ is an air density at mean sea level;

$\rho$ is a air density at the given altitude; and $K_a$ is a compressibility correction.

Since the TAS 410 of the aircraft 400 increases with the altitude of the aircraft 400, some portion of the $\Delta E_{TOTAL}$ is used to maintain the required speed. Therefore, a portion of the $\Delta E_{TOTAL}$ is converted to KE. The KE is represented using the equation (3):

$$\text{KE required} = v\,dv/dt$$

Furthermore in an exemplary third step, the remaining energy which is used for the PE change is computed by subtracting the value of the KE required, obtained in the second step, from the computed excess energy. Therefore, the remaining energy available for the PE change is expressed using the equation (4):

$$\text{remaining energy} = f_{excess} v/m - v(dv/dt)$$

In addition in an exemplary fourth step, dh/dt is computed using equation:

$$dh/dt = (f_{excess} v/m - v(dv/dt))/g$$

Also in this embodiment, the aircraft performance predictions for the next time step are computed as shown below. Exemplary aircraft performance predictions includes flight parameters, such as the flying altitude, the aircraft speed, distance covered by the aircraft 400, time, fuel consumed and the aircraft gross weight. In this embodiment, the altitude of the aircraft 400 for the next time step is computed using equation:

$$\text{ALT}_n = \text{ALT}_{n-1} + \int (dh/dt) dt \quad (13)$$

wherein, n is a time step (e.g., n=

$\text{ALT}_n$ is an altitude at the nth time step; and $\text{ALT}_{n-1}$ is an altitude at the (n−1)th time step.

Moreover in this embodiment, the TAS 410 of the aircraft 400 for the next time step is computed as shown below. In the climb segment 304, shown in FIG. 3, TAS 410 at the nth time step is obtained using equation:

$$V_{TASn} = V_{TASn-1} + \int (dv/dt) dt$$

wherein, n is a time step (e.g., n=0, 1, 2 . . . );

$V_{TASn}$ is a TAS at the nth time step; and $V_{TASn-1}$ is a TAS at the (n−1)th time step.

Also, TAS 410 is computed in the constant CAS climb segment 308 and the constant MACH climb segment 312 for a given altitude, CAS and delta international standard atmosphere (DISA). The altitude is obtained using the equation (13) show above. The CAS of the aircraft 400 is held constant. The DISA is the temperature difference with respect to international standard atmosphere which is obtained by computing a difference between an actual temperature and an ISA temperature. The ISA temperature is computed using equation:

$$\text{ISA}_{temperature} = T_0 - 1.98 * [\text{ALT(feet)}/1000]$$

wherein,

T0 is a temperature at mean sea level.

Moreover, the MACH number is computed using standard ISA equations and the TAS 410 is computed using the equation:

$$V_{TAS} = M * a$$

wherein,

M is a Mach number; and a is a speed of sound at the flying altitude.

Furthermore in this embodiment, the gross weight for the next time step is obtained using equation:

$$GW_n = GW_{n-1} - \int \text{fuelflowrate} * dt$$

wherein,
n is a time step (e.g., n=0, 1, 2 . . . );
GWn is a gross weight at nth time step; and
GWn−1 is a gross weight at (n−1)th time step.
In addition, fuel flow rate is computed using engine data stored in the performance database.

Also in this embodiment, the distance for the next time step is obtained using equation:

$$DIST_n = DIST_{n-1} + \int V_{TAS} * dt$$

wherein,
n is a time step (e.g., n=0, 1, 2 . . . );
DISTn is a distance at nth time step; and
DISTn−1 is a distance at (n−1)th time step.

In addition, time for the next time step is obtained using equation:

$$TIME_n = TIME_{n-1} + dt$$

wherein,
n is a time step (e.g., n=0, 1, 2 . . . );
TIMEn is a time at nth time step; and
TIMEn−1 is a time at (n−1)th time step.

Figure 5:
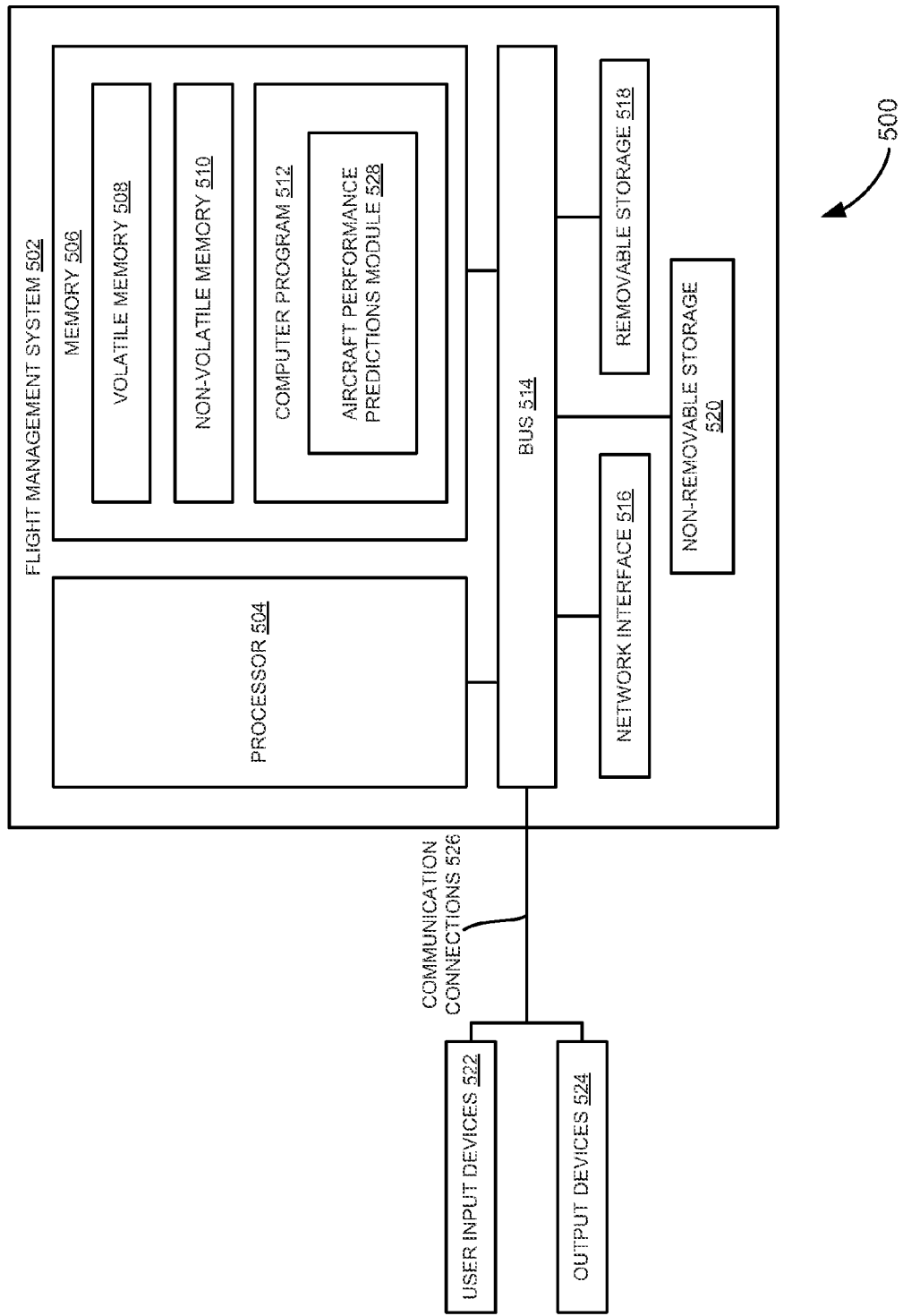
FIG. 5 illustrates the FMS including an aircraft performance predictions, module for determining the aircraft performance predictions for the climb flight phase using the processes shown in FIGS. 1 and 2, according to one embodiment.

Now referring to FIG. 5, which illustrates the FMS 502 including an aircraft performance predictions module 528 for determining the aircraft performance predictions for the climb flight phase using the processes shown in FIGS. 1 and 2, according to one embodiment. FIG. 5 and the following discussions are intended to provide a brief, general description of a suitable computing environment in which certain embodiments of the inventive concepts contained herein are implemented.

The FMS 502 includes a processor 504, memory 506, a removable storage 518, and a non-removable storage 520. The FMS 502 additionally includes a bus 514 and a network interface 516. As shown in FIG. 5, the FMS 502 includes access to the computing system environment 500 that includes one or more user input devices 522, one or more output devices 524, and one or more communication connections 526 such as a network interface card and/or a universal serial bus connection.

Exemplary user input devices 522 include a digitizer screen, a stylus, a trackball, a keyboard, a keypad, a mouse and the like. Exemplary output devices 524 include a display unit of the personal computer, a mobile device, the FMS, and the like. Exemplary communication connections 526 include a local area network, a wide area network, and/or other network.

The memory 506 further includes volatile memory 508 and non-volatile memory 510. A variety of computer-readable storage media are stored in and accessed from the memory elements of the FMS 502, such as the volatile memory 508 and the non-volatile memory 510, the removable storage 518 and the non-removable storage 520. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards. Memory Sticks™, and the like.

The processor 504, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 504 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 504 of the FMS 502. For example, a computer program 512 includes machine-readable instructions capable of providing aircraft performance predictions for the climb flight phase profile in the FMS 502, according to the teachings and herein described embodiments of the present subject matter. In one embodiment, the computer program 512 is included on a compact disk-read only memory (CD-ROM) and loaded from the CD-ROM to a hard drive in the non-volatile memory 510. The machine-readable instructions cause the FMS 502 to encode according to the various embodiments of the present subject matter.

As shown, the computer program 512 includes an aircraft performance predictions module 528. For example, the aircraft performance predictions module 528 can be in the form of instructions stored on a non-transitory computer-readable storage medium. The non-transitory computer-readable storage medium having the instructions that, when executed by the FMS 502, causes the FMS 502 to perform the one or more methods described in FIGS. 1 through 4.

The systems and methods described herein enable determining the current predicted aircraft state without making any assumptions with respect to the current predicted aircraft state parameters. Further, the above mentioned embodiments enable determining aircraft performance predictions along the flight path without making any assumptions to simplify the flight path, Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of aircraft performance predictions for climb flight phase in a flight management system (FMS), comprising:
    determining current predicted aircraft state using a total energy of the aircraft by the FMS;
    computing excess energy available in an engine of the aircraft by the FMS;
    computing a change of speed of the aircraft at a given point in the climb flight phase by the FMS;
    computing kinetic energy (KE) change required for the computed speed change by the FMS;
    computing remaining energy available based on the computed excess energy and the computed KE change by the FMS, wherein the computed remaining energy available is used for changing potential energy of the aircraft in the climb flight phase; and computing aircraft performance predictions for the climb flight phase using the computed remaining energy and the determined current predicted aircraft state by the FMS.

2. The method of claim 1, wherein
the aircraft performance predictions comprise an altitude of the aircraft for the climb flight phase.

3. The method of claim 1, wherein computing aircraft performance predictions for the climb flight phase using the computed remaining energy comprises:
determining the aircraft performance predictions for the climb flight phase for each way point using the computed remaining energy.

4. The method of claim 1, wherein the excess energy available in the engine of the aircraft is computed using an equation:

$$f_{excess}v/m=g(dh/dt)+v(dv/dt)$$

wherein, $f_{excess}$ is the excess force available in the aircraft, x is a distance covered by the aircraft, m is a mass of the aircraft, g is acceleration due to gravity, h is altitude of the aircraft above ground level and v is a true air speed (TAS).

5. The method of claim 1, wherein the change of speed of the aircraft at a given point in the climb flight phase is computed using an equation:

$$dv=TAS_n-TAS_{n-1}$$

wherein, n is a time step (e.g., n=0, 1, 2 ... ).

6. The method of claim 1, wherein KE change required for the computed speed change is computed using an equation:

$$KE\ required=vdv/dt$$

wherein, v is the TAS.

7. The method of claim 1, wherein the remaining energy available based on the computed KE change is computed using an equation:

$$remaining\ energy=f_{excess}v/m-v(dv/dt)$$

wherein, $f_{excess}$ is the excess force available in the aircraft, v is the TAS and in is the mass of the aircraft.

8. An aircraft, comprising:
a flight management system (FMS), wherein the FMS comprises:
a processor; and
a memory coupled to the processor, wherein the memory includes an aircraft performance predictions module having instructions to:
determine current predicted aircraft state using a total energy of the aircraft;
compute excess energy available in an engine of the aircraft;
compute a change of speed of the aircraft at a given point in the climb flight phase;
compute kinetic energy (KE) change required for the computed speed change; and
compute remaining energy available based on the computed excess energy and the computed KE change, wherein the computed remaining energy available is used by a pilot for changing potential energy of the aircraft in the climb flight phase; and
compute aircraft performance predictions for climb flight phase using the computed remaining energy and the determined current predicted aircraft state.

9. The aircraft of claim 8, wherein
the aircraft performance predictions comprise an altitude of the aircraft for the climb flight phase.

10. The aircraft of claim 8, wherein the aircraft performance predictions module further having instructions to:
determine the aircraft performance predictions for the climb flight phase for each way point using the computed remaining energy.

11. A flight management system (FMS), comprising:
a processor; and
a memory coupled to the processor, wherein the memory includes an aircraft performance predictions module having instructions to:
determine current predicted aircraft state using a total energy of the aircraft;
compute excess energy available in an engine of the aircraft;
compute a change of speed of the aircraft at a given point in the climb flight phase;
compute kinetic energy (KE) change required for the computed speed change; and
compute remaining energy available based on the computed excess energy and the computed KE change, wherein the computed remaining energy available is used by a pilot for changing potential energy of the aircraft in the climb flight phase; and
compute aircraft performance predictions for climb flight phase using the computed remaining energy and the determined current predicted aircraft state.

12. The FMS of claim 11, wherein
the aircraft performance predictions comprise an altitude of the aircraft for the climb flight phase.

13. The FMS of claim 11, wherein the aircraft performance predictions module further having instructions to:
determine the aircraft performance predictions for the climb flight phase for each way point using the computed remaining energy.

14. The FMS of claim 11, wherein the aircraft performance predictions module further having instructions to compute the excess energy available in the engine of the aircraft using an equation:

$$f_{excess}v/m=g(dh/dt)+v(dv/dt)$$

wherein, $f_{excess}$ is the excess force available in the aircraft, x is a distance covered by the aircraft, m is a mass of the aircraft, g is acceleration due to gravity, h is altitude of the aircraft above ground level and v is a true air speed (TAS).

15. The FMS of claim 11, wherein the aircraft performance predictions module further having instructions to compute the change of speed of the aircraft at a given point in the climb flight phase using an equation:

$$dv=TAS_n-TSA_{n-1}$$

wherein, n is a time step (e.g. n=0, 1, 2 ... ).

16. The FMS of claim 11, wherein the aircraft performance predictions module further having instructions to compute KE change required for the computed speed change using an equation:

$$KE\ required=vdv/dt$$

wherein, v is the TAS.

17. The FMS of claim 11, wherein the aircraft performance predictions module further having instructions to compute the remaining energy available based on the computed KE change using an equation:

$$remaining\ energy=f_{excess}v/m-v(dv/dt)$$

wherein, $f_{excess}$ is the excess force available in the aircraft, v is the TAS and in is the mass of the aircraft.

18. A non-transitory computer-readable storage medium for aircraft performance predictions for climb flight phase in a flight management system having instructions that, when executed by a computing device, cause the computing device to perform a method comprising:
- determining current predicted aircraft state using a total energy of the aircraft;
- computing excess energy available in an engine of the aircraft by the FMS;
- computing a change of speed of the aircraft at a given point in the climb flight phase by the FMS;
- computing kinetic energy (KE) change required for the computed speed change by the FMS;
- computing remaining energy available based on the computed excess energy and the computed KE change by the FMS, wherein the computed remaining energy available is used for changing potential energy of the aircraft in the climb flight phase; and
- computing aircraft performance predictions for the climb flight phase using the computed remaining energy and the determined current predicted aircraft state.

19. The non-transitory computer-readable storage medium of claim 18, wherein
the aircraft performance predictions comprise an altitude of the aircraft for the climb flight phase.

20. The non-transitory computer-readable storage medium of claim 18, wherein determining aircraft performance predictions for the climb flight phase using the computed remaining energy comprises:
- determining the aircraft performance predictions for the climb flight phase for each way point using the computed remaining energy.

21. The non-transitory computer-readable storage medium of claim 18, wherein the excess energy available in the engine of the aircraft is computed using an equation:

$$f_{excess}v/m = g(dh/dt) + v(dv/dt)$$

wherein, $f_{excess}$ is the excess force available in the aircraft, x is a distance covered by the aircraft, m is a mass of the aircraft, g is acceleration due to gravity, h is altitude of the aircraft above ground level and v is a true air speed (TAS).

22. The non-transitory computer-readable storage medium of claim 18, wherein the change of speed of the aircraft at a given point in the climb flight phase is computed using an equation:

$$dv = TAS_n - TAS_{n-1}$$

wherein, n is a time step (e.g., n=0, 1, 2 ... ).

23. The non-transitory computer-readable storage medium of claim 18, wherein KE change required for the computed speed change is computed using an equation:

$$KE\ required = v\,dv/dt$$

wherein, v is the TAS.

24. The non-transitory computer-readable storage medium of claim 18, wherein the remaining energy available based on the computed KE change is computed using an equation:

$$remaining\ energy = f_{excess}v/m - v(dv/dt)$$

wherein, $f_{excess}$ is the excess force available in the aircraft, v is the TAS and m is the mass of the aircraft.

* * * * *